[19] United States Patent
Davies

(10) Patent No.: US 9,165,268 B2
(45) Date of Patent: Oct. 20, 2015

(54) SYSTEM AND METHOD FOR ESTIMATING MARKING MATERIAL USAGE FOR A PRINTING SYSTEM

(75) Inventor: Daniel Davies, Palo Alto, CA (US)

(73) Assignee: XEROX CORPORATION, Norwalk, CT (US)

(*) Notice: Subject to any disclaimer, the term of this patent is extended or adjusted under 35 U.S.C. 154(b) by 236 days.

(21) Appl. No.: 13/465,635

(22) Filed: May 7, 2012

(65) Prior Publication Data

US 2013/0293925 A1 Nov. 7, 2013

(51) Int. Cl.
G06Q 10/06 (2012.01)

(52) U.S. Cl.
CPC ................................. G06Q 10/06 (2013.01)

(58) Field of Classification Search
CPC ........................................................ G06Q 10/06
USPC .......................................................... 399/27, 79
See application file for complete search history.

(56) References Cited

U.S. PATENT DOCUMENTS 6,356,359 B1    3/2002  Motamed
7,804,629 B2    9/2010  Jacobs et al.
8,289,572 B2*  10/2012  Ernst et al. .................... 358/1.9
2010/0128314 A1*  5/2010  Loce et al. ..................... 358/3.06
2010/0158547 A1*  6/2010  Carling et al. .................. 399/27

OTHER PUBLICATIONS

From Google Search Lossless Wavelet Compression by Ian kaplan Aug. 2002 http://www.bearcave.com/misl/misl_tech/wavelets/compression/.*
Wavelet Compression by Kaplan August 2002 From Google Search Lossless Wavelet Compression by Ian kaplan Aug. 2002 http://www.bearcave.com/misl/misl_tech/wavelets/compression/.*

* cited by examiner

Primary Examiner — Chuong A Ngo
Assistant Examiner — Bharatkumar Shah
(74) Attorney, Agent, or Firm — Pillsbury Winthrop Shaw Pittman, LLP

(57) ABSTRACT

A method for determining a marking material usage estimate for a print job to be performed by a printing system is provided. The method is implemented in a computer system having one or more processors configured to execute one or more computer program modules. The method includes receiving compressed data of an image of the print job, wherein the image has a plurality of image pixels each having an image pixel intensity value, wherein the image pixels are transformed into the compressed data using a compression scheme; obtaining marking material usage statistics by partially decompressing the compressed data so as to obtain average pixel intensity values of the image pixels in the image; and determining the marking material usage estimate for the print job using the obtained marking material usage statistics.

9 Claims, 1 Drawing Sheet

SYSTEM AND METHOD FOR ESTIMATING MARKING MATERIAL USAGE FOR A PRINTING SYSTEM

BACKGROUND

1. Field

The present disclosure relates to printing systems, and more specifically, to a system and a method for estimating the amount of marking material required for a print job.

2. Description of Related Art

When pricing a print job, print shops must be able to estimate the needed consumables and expenses, e.g., paper sheets, binding tape, periodic printer maintenance and shipping. In any print process, a key cost component is the marker or marking material used to generate the prints. In the case of xerographic printing, this marking material, toner, can be a significant factor in determining the overall expense of producing the print job.

Inaccurate marking material usage estimation may negatively impact print shops in a variety of ways. If the shop underestimates the amount of marking material needed to print a job, job production costs will exceed the estimate and the shop may lose money. Alternatively, if the shop overestimates the amount of marking material needed to print a job, its pricing may be high, causing the print shop to lose the job to a competitor.

The amount of marking material used for a page of the print job is generally related to the intensity value assigned to each pixel of that page. A straightforward approach is to acquire these intensity values is to produce an uncompressed bitmap of the page and sum the intensity values at the pixel locations. This approach of gathering image data (from the uncompressed bitmap) to be used to estimate marking material usage is relatively slow. That is, the steps of writing and reading a full bitmap used in this approach are often computationally inefficient and expensive, and decrease the performance of the printing system. Therefore, a high performance approach for estimating marking material usage is needed.

SUMMARY

According to one aspect of the present disclosure, a method for determining a marking material usage estimate for a print job to be performed by a printing system is provided. The method is implemented in a computer system having one or more processors configured to execute one or more computer program modules. The method includes receiving compressed data of an image of the print job, wherein the image has a plurality of image pixels each having an image pixel intensity value and wherein the image pixels are transformed into the compressed data using a compression scheme; obtaining marking material usage statistics by partially decompressing the compressed data so as to obtain average pixel intensity values of the image pixels in the image; and determining the marking material usage estimate for the print job using the obtained marking material usage statistics.

According to another aspect of the present disclosure, a system for determining a marking material usage estimate for a print job to be performed by a printing system is provided. The system includes a processor that is configured to: receive compressed data of an image of the print job, wherein the image has a plurality of image pixels each having an image pixel intensity value and wherein the image pixels are transformed into the compressed data using a compression scheme; obtain marking material usage statistics by partially decompressing the compressed data so as to obtain average pixel intensity values of the image pixels in the image; and determine the marking material usage estimate for the print job using the obtained marking material usage statistics.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure proposes a method for estimating marking material usage of a print job from a compressed representation of an image without creating a full page bitmap. The method is configured to acquire average intensity values of the pixels in the image directly from the compressed representation of the image (i.e., without writing a full bitmap). Since the proposed method does not depend on the full bitmap extraction, this method is computationally more efficient than the marking material usage estimation methods discussed in the background section.

Specifically, the method of the present disclosure is configured to parse a compressed representation of an image of the print job and to record statistics about the image without creating a full page bitmap. The most common statistic may include a simple sum of all the pixel intensities for each separation, where each separation is associated with a colorant, such as cyan, magenta, yellow or black. If the pixels are tagged in some way that controls rendering and the amount of marking material deposited depends significantly on the tag value, a separate sum for each tag value within a color separation may be calculated. The sum for a tag value incorporates all pixel intensity values having that tag value for the current separation. These calculated sums are then used to estimate marking material usage.

Figure 1:
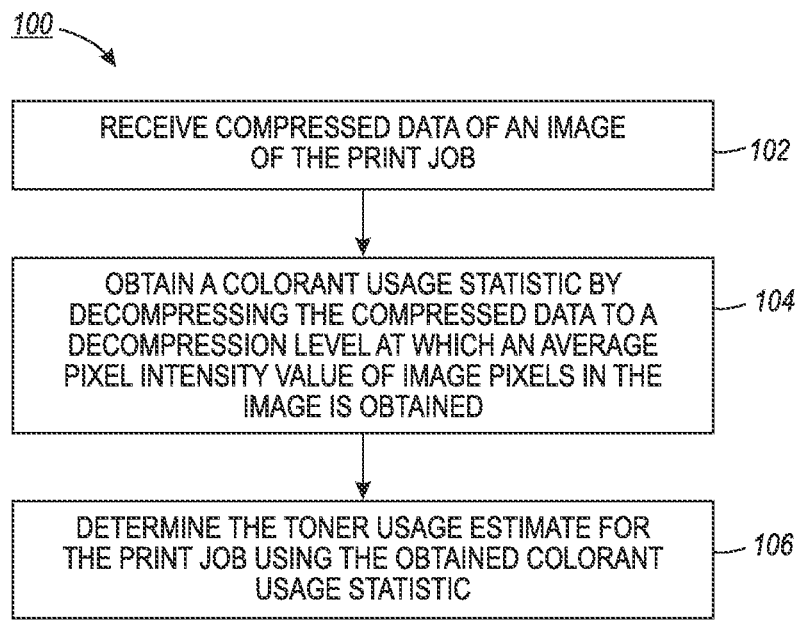
FIG. 1 is a flowchart summarizing a method for estimating marking material usage of a print job from a compressed representation of an image of the print job without creating a full page bitmap in accordance with an embodiment of the present disclosure.
Figure 2:
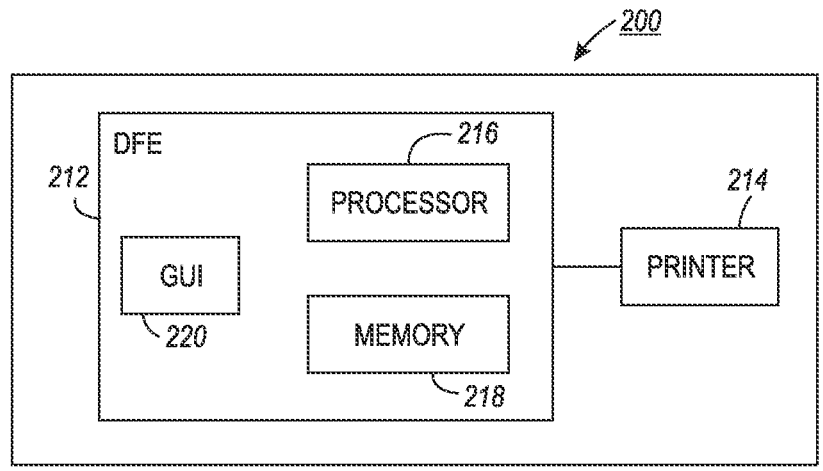
FIG. 2 is a system for estimating marking material usage of a print job in accordance with an embodiment of the present disclosure.

FIG. 1 shows a flowchart summarizing a method 100 for determining a marking material usage estimate for a print job to be performed by a printing system having at least a print engine. The method 100 is implemented in a computer system comprising one or more processors configured to execute one or more computer program modules. FIG. 2 shows a system 200 for determining a marking material usage estimate for a print job in accordance with an embodiment of the present disclosure.

Referring to FIGS. 1 and 2, at procedure 102, a compressed data of an image of the print job is received by a processor 216.

In another embodiment, the processor 216 is configured to receive an input image and to compress the input image into the compressed data using a compression scheme stored therein. The compression scheme(s) may also be stored in a memory 218 that is operatively connected to the processor 216.

The image of the print job generally has a plurality of image pixels, where each pixel has an image pixel intensity value.

The compressed data is not an image by itself and includes a set of instructions that are used to reproduce the input image. These instructions are followed during a decompression procedure to reproduce the input image. Different compression techniques may have different instructions. For example, if an image is compressed using a runlength compression scheme, the compressed data may include the following instructions: "emit 140 pixels with value 0; emit 22 pixels with value 240, emit 1002 pixels with value 0," etc.

The compressed data is produced by using a compression scheme to compress the image pixels. The compressed data represents a plurality of pixels each having an intensity value that matches the image pixel intensity value of the corresponding image pixel of the original image in accordance with the compression scheme.

When using a "lossless" compression, decompressed pixels (i.e., the values of pixels produced by decompressing the compressed data) exactly match the corresponding pixels from the original image. When using a "lossy" compression, decompressed pixels closely approximate the corresponding pixels from the original image. In both the "lossless" compression and the "lossy" compression, the decompressed pixels generally define the image that will be sent to the printer.

During the compression of the image, the image may generally be divided into regions or blocks whose dimensions depend on the compression scheme being used. For example, in a JPEG compression scheme, the regions are 8×8 pixel squares and, in a run-length compression scheme, the regions are horizontal runs of pixels which all have the same intensity value. The compressed data generally represents these blocks or regions of image pixels.

At procedure 104, the processor 216 is configured to obtain marking material usage statistics by partially decompressing the compressed data so as to obtain average pixel intensity values of the image pixels in the image.

The marking material usage statistics may include a sum of all the pixel intensity values for each colorant separation in the image. The marking material usage statistics may include a sum of all the pixel intensity values for each page in the print job. That is, a sum of all the pixel intensity values over each separation of each page image is obtained, and then the summed intensities for the pages are summed together to get marking material usage for the entire print job.

In one embodiment, the extent to which the partial decompression is performed may depend on a particular compression scheme (and the decompression scheme thereof) being used. That is, the processor 216 is configured to execute the decompression scheme just far enough to be able to obtain the average pixel intensity value of a block or a region of image pixels. In other words, the decompression instructions of the decompression scheme for every region or block are processed by the processor 216 just enough to obtain the average pixel intensity for that region or block of image pixels.

By partially decompressing the compressed data to obtain average pixel intensity values of image pixels, the method of the present disclosure avoids actually writing the pixels into a full page bitmap and reading their intensity values back from the full page bitmap. This (i.e., avoiding writing and reading from the full page bitmap) significantly increases the performance of the present system compared to other marking material usage estimate schemes that create and analyze bitmaps to obtain a marking material usage estimate.

At some point during the execution of each decompression scheme (JPEG, run length, etc), the exact or average intensity values for a block of pixels may be obtained. That point is the same for all images that are being decompressed using that compression scheme. For example, when decompressing the run-length compressed data, a set of pixel intensities are stored as soon as the length of a run of pixels and the intensity value that is assigned to all of those pixels are known. This is recomputed for each run of pixels.

The processor 216 is also configured to multiply the obtained average pixel intensity value with the number of pixels in the region or the block in order to obtain a sum of pixel intensities for that block or region. The processor 216 is also configured to add the obtained product (i.e., the sum of pixel intensities for that block or region) to a running sum of pixel intensities.

The present disclosure describes techniques for gathering marking material usage statistics from compressed data compressed using different compression schemes.

The method is configured to support upper plane multi-mode data compression scheme (e.g., run-length data compression scheme) and lower plane multi-mode data compression scheme (e.g., JPEG-like data compression scheme). The method is also configured to support other compression schemes that are currently not supported by the multi-mode data compression. For example, the method is configured to support wavelet-based data compression scheme, which is a data compression scheme that is not supported by the multi-mode data compression.

Some compression schemes produce new data by referencing previous data. For example, the many variants of Lempel-Ziv (LZ) compression scheme rely on producing new bytes by copying strings of previously-decompressed bytes to the current position in the output stream. CCITT Group 4 compression scheme relies on values from the previous scanline. CCITT is a French acronym for Comite Consultatif International de Telegraphique et Telephonique (International Telegraph and Telephone Consultative Committee). Arithmetic coding scheme depends on a neighborhood of decompressed pixels to compute the next pixel. The decompression state referred in the above-noted examples is not a "full page bitmap." This decompression state is far smaller than a full page bitmap and is arranged so as to optimize decompressor performance. The dimensions of this decompression state may or may not be related to the dimensions of the full page bitmap. When an output bitmap is created, decompressors often use the output bitmap as their state. For the purposes of this present disclosure, it is assumed that the decompressors support whatever private state they require without depending on a full output bitmap.

An LZ-like decompressor may use a single ring buffer whose length equals the greatest distance over which bytes may be copied. A decompressor that relies on data in one or more scanlines may keep a ring of scanline buffers. Maintaining the decompressor state in relatively small buffers improves the performance as long as the buffers fit in the processor's caches. That is, the lesser the decompressed data is to be maintained, the more efficient the processor can be to store that data.

In LZ and Deflate decompression schemes, where runs of decompressed pixels (where the pixels in the runs have varied pixel intensity values) are copied to produce new runs of decompressed pixels, the average pixel intensity values are calculated by examining the pixels in each run. In other decompression schemes, like JPEG and wavelet decompression schemes, the average pixel intensity value of the block or region of pixels is obtained without having to determine the exact pixel intensity value of each of the image pixels in the block. In some other decompression schemes, like run-length decompression scheme, the exact pixel intensity value of each block of image pixels is determined. In the run-length decompression scheme, the average pixel intensity value of each block of image pixels equals the determined exact pixel intensity value.

A procedure for obtaining marking material usage statistics from run-length compressed data is explained in detail first. The compressed data, compressed using the run-length compression scheme, represents a plurality of runs of pixels. Each run has a run length. That is, pure run length compression schemes such as CCITT Group 3 (for binary images) or PackBits specify an intensity value and a run length. The decompressor generally writes the intensity value into the next "runLength" pixels.

When acquiring the marking material usage statistics (i.e., rather than writing the output), the intensity value is simply multiplied by the runlength to obtain a sum of intensities and the obtained product (i.e., sum of intensities) is added to the running sum of intensities.

That is, the marking material usage statistics for run-length compressed data are obtained by parsing the run-length compressed data to obtain a pixel intensity value of each of run of pixels; multiplying the obtained pixel intensity value of each of run of pixels with the corresponding run length of the run to obtain a sum of intensity values for the run; and adding the sum of pixel intensity values for each run to obtain a running sum of pixel intensity values for the runs over the entire compressed data.

CCITT Group 4 compression scheme specifies run lengths of binary pixels, but the run lengths are often relative to white/non-white boundaries in the previous scanline. That previous scanline is part of the decompression state. Once the run lengths of the non-white runs are determined, these run lengths are simply added to the running sum of non-white pixels. With binary images, there are only two intensity values so there is no need to multiply the run length by the intensity values.

A procedure for obtaining marking material usage statistics from JPEG-compressed data is explained in detail next. The JPEG compressed data represents a plurality of blocks of image pixels.

To perform a JPEG compression, a block (e.g., 8 by 8) of image pixels are converted into a matching block of spatial frequency coefficients. The "first" spatial frequency coefficient (i.e., the "DC" coefficient) in the matching block is the average value of the image pixels in the block. The remaining coefficients in the matching block describe how these average values change across the block.

For the purposes of acquiring data for marking material usage estimation, the first frequency coefficient is simply multiplied by the number of pixels in the block and the obtained product is added to the running sum of intensities. This procedure of capturing marking material usage statistics from the JPEG-compressed data avoids the bulk of the JPEG decompression process, so greatly improves the performance.

In other words, the marking material usage statistics for JPEG compressed data are obtained by parsing the JPEG compressed data to obtain the average pixel intensity value of each of the plurality of blocks, multiplying the average pixel intensity value by the number of pixels in the corresponding block to obtain a sum of pixel intensity values for the block, and adding the sum of pixel intensity values for each block to obtain a running sum of pixel intensity values for the plurality of blocks.

A procedure for obtaining marking material usage statistics from wavelet compressed data is explained in detail next.

In wavelet compression schemes, an image is encoded in an overlapping sequence of planes, each representing a higher spatial frequency. A lowest spatial frequency plane generally represents the average of the remaining frequency planes. To gather marking material usage statistics, the lowest frequency plane is only decompressed and a sum of the intensity values in the lowest frequency plane is determined.

In other words, the marking material usage statistics for wavelet compressed data are obtained by parsing the compressed data to obtain a sum of the pixel intensity values in the lowest spatial frequency plane.

A procedure for obtaining marking material usage statistics when using a vector instruction set to implement LZ-like byte-copying decompression scheme is explained in detail next. Modern vector instructions operate on 16, 32 or more bytes at a time. These decompression schemes also have instructions that add all of the bytes in a vector together. The distances over which the bytes are copied are often less than the number of bytes a single vector can register.

If the distance over which the bytes are copied is an exact divisor of the length of a vector in bytes, then a sum of the intensities in a vector is determined only once. The determined sum is then multiplied by the number of vectors in the run.

If the run length is greater than the distance over which the bytes are copied, then the sequence of the bytes being written is composed of repeating pattern of bytes.

If the run length is an exact multiple of the distance over which the bytes are copied, then a sum of the pixels in the repeating pattern is first determined. The determined sum is multiplied by the runlength or the distance to determine a product, and the product is then added to the running sum of intensities.

If the run length is not an exact multiple of the distance over which the bytes are copied but the sum of intensities is calculated as though it was, then this causes the decompressor to write off the end of the current run (i.e., during the process of writing repeating runs). In this case, the values of the overflow pixels are summed up and are subtracted from the running sum of pixel intensities. The "extra" pixels are found by shifting the vector by {runlength MOD vectorlength}. "MOD" in {runlength MOD vectorlength} represents modulus. In {runlength MOD vector length}, runlength is divided by vectorlength and a remainder (i.e., a whole number) is returned.

A procedure for obtaining marking material usage statistics from multi-component pages is explained in detail next. Some compression schemes may encode different types of data in different ways. For example, black text is encoded using a binary compression scheme and colored images are encoded using a continuous tone compression scheme.

The compressed data represents a plurality of image components that are combined using a selector image. That is, since these image components are arbitrarily shaped, these image components are generally combined using a selector image.

In this compression scheme, the image components and the selector image are all assumed to be compressed. The sum of the intensities of each of the image components may be computed.

If it is known that the image components seldom overlap, the components' intensity sums are simply added together to provide an accurate marking material usage estimate.

If the selector image is decompressed in parallel with the image components and if the sum of intensities of each image component is composed of only of the pixels from that component (visible in the final image), then the sums of intensities for each component are simply be added together to provide an accurate marking material usage estimate.

In another approach, the image components and selector image are decompressed in parallel, the selector image is then used to combine the image components, and a sum the intensities of chosen image components is immediately determined. In this approach, no final bitmap needs to be created because the pixel values are added together rather than being written to the memory. Images are often quite large so avoiding writing and reading the images into the memory is significant.

The present disclosure provides a detailed explanation for only the concept of processing multiple components of a separation in parallel. However, it is contemplated by the present disclosure that it is also possible to process separations or entire pages in parallel as well. The marking material usage statistics from each separation or page may then be summed.

At procedure 106, the processor 216 is configured to determine a marking material usage estimate for the print job using the obtained marking material usage statistics.

The number of standard (e.g., 8.5 by 11) size pages that can be printed from one marking material bottle for a specific type of printer with a standard area coverage is generally obtained from the information published by the printer manufacturing companies. For example, this information may include "25,000 standard size pages at 11.25% area coverage" for a specific type of printer.

Alternatively, a marking material bottle is weighed before and after printing a large number of pages with a page image having a known area coverage. The weight information may then be inferred to determine the number of pages that could be printed with a full marking material bottle. That is, "number of pages printed per fraction of marking material bottle consumed" information is used to determine the number of pages that could be printed with a full marking material bottle.

The "area coverage" for each page of the print job for which an estimate is desired may be calculated. This is the total of the intensity values for a page image divided by maximum possible intensity sum for that page. The maximum possible intensity sum is the number of pixels on the page times the maximum intensity that can be assigned to a pixel.

In the next step, the current page of a job is converted into a number of equivalent standard size pages at the standard area coverage by computing the quantity (actual page area divided by the area of an 8.5×11 size page)*(actual area coverage divided by the standard area coverage). The result is then divided by the standard number of pages printed per marking material bottle to obtain the fraction of a marking material bottle used for one page. Alternatively, the total number of equivalent standard size pages at standard area coverage for an entire job is computed and then the total number of equivalent standard size pages is divided by the number of standard of pages printed per marking material bottle to calculate the fraction of a marking material bottle used for the entire job.

Referring to FIG. 2, the marking material estimation system 200 facilitates estimating an amount of marking material consumed by a printer for one or more print jobs in order to track marking material costs and accurately estimate print job costs, in accordance with various aspects described herein.

The system 200 includes a digital front end (DFE) 212 that is coupled to a printer or print engine 214. For example, the DFE may be a DocuSP™ DFE, also called a Freeflow™ Print Server, which includes several features that may be used in conjunction with the described embodiments.

In one embodiment, the DFE 212 may include measurements relating to standard pages at standard area coverage per bottle of marking material for a particular type of printer. In such an embodiment, the DFE may estimate marking material usage for that type of printer whether or not that type of printer (or any printer) is connected to the DFE.

The system 200 includes the processor 216 that executes, and the memory 218 that stores, computer-executable instructions for carrying out the various procedures and performing the various functions described herein.

The processor 216 is configured to receive compressed data of an image of the print job, wherein the image having a plurality of image pixels each having an image pixel intensity value, wherein the compressed data is represented in a compression scheme compressing the image pixels; to obtain marking material usage statistics by partially decompressing the compressed data so as to obtain average pixel intensity values of the image pixels in the image; and to determine the marking material usage estimate for the print job using the obtained marking material usage statistics.

The system 200 further includes a graphical user interface (GUI) 220 that provides user input to the processor 216 and/or memory 218, and displays information to a user. The memory 218 may store one or more print jobs.

The processor 216 may optionally execute a marking material estimate report generation algorithm to generate a marking material estimate report, and marking material estimation information is presented to the user. In one example, the information for each page of the print job is presented on a page by page basis. In another example, the information for representative pages of the print job is presented. The information is displayed on the GUI 220, printed on a sheet of paper by the printer 214, transmitted electronically or wirelessly to a device (e.g., a PC, laptop, cell phone, smartphone, PDA, workstation, or personal communication device etc.) of the user's choosing, etc.

When page-by-page or representative-page marking material estimation is used, the information for each page is displayed by page number(s) or as thumbnails of the pages themselves. If the estimation information is transmitted electronically to the user, it may be in a form readily converted to a spreadsheet or added to a database. In addition to the marking material estimate information, the processor 216 is also configured to calculate and provide a marking material cost estimate information corresponding to the marking material estimate information in the generated report.

In one embodiment, a marking material estimation component may be a module that is coupled to an existing DFE as an after-market add-on or the like, to provide back-portability for print engines and/or DFEs manufactured without an integral marking material estimation component. Accordingly, such a marking material estimation component includes a processor, a memory, and optionally a GUI.

While many types of statistics are possible, the present disclosure concentrates on computing the average area coverage for an entire separation. This is particularly well suited to situations where the amount of state being maintained is kept to a minimum. Only, the number of equivalent standard-sized page image (at the standard area coverage) per each separation is generally maintained. This minimizes the amount of state that must be carried from page to page in the print job. Once all pages have been imaged, these running totals are multiplied by the number of times the job will be printed (number of copies).

The method and the system of the present disclosure, thus, extracts statistics that are used to estimate marking material usage directly from pages that were compressed using a variety of compression schemes. The method avoids bitmap-based schemes for acquiring marking material usage data. The performance of this method is significantly higher than the full page bitmap-based schemes that create and analyze full page bitmaps to estimate marking material usage. The method of the present disclosure is approximately 1.6 times more efficient than other decompression schemes on 600 dpi, letter-sized data. Also, skipping the steps of writing and reading the full bitmap increases performance.

While the accuracy of a marking material usage technique that uses a simple pixel intensity average from the compressed data is generally not as high or precise as marking material usage techniques that use a full page bitmap, the estimate obtained using the technique of the present disclosure is adequate for most applications. Also, customers are generally willing to accept a reduction in accuracy for a significant reduction in the time required to perform marking material usage estimation.

Although the concept of producing marking material usage statistics without producing full page bitmaps has been discussed in the present disclosure, the techniques described herein may be used in parallel with producing the full page bitmaps if the produced full page bitmaps are used for purposes other than marking material usage estimation.

The method and the system of the present disclosure may be used in production printer controllers and in production workflow tools.

The term "marking material" as used herein shall be construed broadly to cover toner marking material, ink marking material and any other marking material that can generate an image on media.

The term "average" as used herein shall be construed broadly to cover any method or algorithm by which a large set of data is summarized in a smaller set of data or a single datum, such as rolling average, weighted average, median, mode, etc., or any estimates based on such summarization, or any larger mathematical operation including such summarization.

The term "printer" and the term "printing system" as used herein encompass any apparatus and/or system, such as a digital copier, xerographic and reprographic printing systems, bookmaking machine, facsimile machine, multi-function machine, ink-jet machine, continuous feed, sheet-fed printing device, etc. which may contain a print controller (or a processor) and a print engine and which may perform a print outputting function for any purpose.

The term "print controller" and the term "processor" as used herein refer to the software/hardware system component that receives job submissions consisting of input files and job tickets, processes the input file submissions into raster images, submits those raster images to the print engine for printing, gathers accounting information, etc.

The term "print engine" as used herein refers to the unit within the printer or printing system that actually does the printing (i.e., takes pieces of paper and puts marks on those sheets of paper). Print engines may optionally include finishers to staple, bind, punch, etc. the printed sheets.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for determining a marking material usage estimate for a print job to be performed by a printing system, the method is implemented in a computer system comprising one or more processors configured to execute one or more computer program modules, the method comprising:
    receiving wavelet compressed data of an image of the print job, wherein the image having a plurality of image pixels each having an image pixel intensity value and wherein the image pixels are transformed into the wavelet compressed data using a wavelet compression scheme;
    obtaining marking material usage statistics for the wavelet compressed data by partially decompressing the wavelet compressed data so as to obtain average pixel intensity values of the image pixels in the image; and
    determining the marking material usage estimate for the print job using the obtained marking material usage statistics,
    wherein the wavelet compressed data includes an overlapping sequence of planes, each representing a higher spatial frequency,
    wherein the overlapping sequence of planes includes a lowest spatial frequency plane and remaining spatial frequency planes, wherein the lowest spatial frequency plane represents the average of the remaining, overlapping sequence of planes, and
    wherein the obtaining the marking material usage statistics for the wavelet compressed data comprises partially decompressing the wavelet compressed data to obtain a sum of pixel intensity values in the lowest spatial frequency plane.

2. The method according to claim 1, wherein the wavelet compressed data represents a plurality of pixels each having an intensity value that matches the image pixel intensity value of the corresponding image pixel of the image in accordance with the wavelet compression scheme.

3. The method according to claim 1, wherein the wavelet compressed data is decompressed without writing the pixel intensity values of the pixels into a full page bitmap.

4. The method according to claim 1, wherein partially decompressing the wavelet compressed data comprises decompressing the wavelet compressed data to an extent at which the average pixel intensity values of the image pixels in the image are extracted.

5. The method according to claim 1, wherein partially decompressing the wavelet compressed data comprises executing decompression instructions of the wavelet compressed data to an extent at which the average pixel intensity values of the image pixels in the image are extracted.

6. A system for determining a marking material usage estimate for a print job to be performed by a printing system, the system comprising:
    a processor configured to:
        receive compressed data of an image of the print job, wherein the image having a plurality of image pixels each having an image pixel intensity value and wherein the image pixels are transformed into the compressed data using a compression scheme;

obtain marking material usage statistics by partially decompressing the compressed data so as to obtain average pixel intensity values of the image pixels in the image; and determine the marking material usage estimate for the print job using the obtained marking material usage statistics, wherein the image pixels are tagged image pixels each having a tag value, wherein the tag value of each tagged image pixel is configured to control rendering and amount of marking material used for the associated image pixel, wherein the marking material usage statistics include a separate sum for each tag value within a colorant separation in the image, wherein the separate sum for each tag value incorporates all image pixel intensity values having that tag value for that colorant separation, wherein the separate sum for each tag value is used to determine the marking material usage estimate, and wherein the tag values of the tagged image pixels affect the marking material usage estimate.

7. The system according to claim 6, wherein the compressed scheme includes a run-length compression scheme, a wavelet compression scheme, a JPEG compression scheme or a combination of a binary compression scheme and a continuous compression scheme.

8. The method according to claim 1, wherein the partially decompressing the wavelet compressed data comprises decompressing the wavelet compressed data only in the lowest spatial frequency plane so as to obtain the sum of pixel intensity values in the lowest spatial frequency plane.

9. The system according to claim 6, wherein the tag values of the tagged image pixels are configured to affect a relationship between the image pixel intensity value and the amount of the marking material used for the associated image pixel.

* * * * *